Feb. 8, 1966 W. E. DICKINSON 3,234,392

PHOTOSENSITIVE PATTERN RECOGNITION SYSTEMS

Filed May 26, 1961 2 Sheets-Sheet 1

INVENTOR.
WESLEY E. DICKINSON

BY FRASER & BOGUCKI

ATTORNEYS

United States Patent Office 3,234,392 Patented Feb. 8, 1966

3,234,392
PHOTOSENSITIVE PATTERN RECOGNITION SYSTEMS

Wesley E. Dickinson, San Jose, Calif., assignor to International Business Machines Corporation, New York, N.Y., a corporation of New York Filed May 26, 1961, Ser. No. 112,939
8 Claims. (Cl. 250—219)

This invention relates to the recognition of meaningful visual and aural manifestations, and more particularly to devices which utilize reference patterns for the recognition of speech, and to processes for preparing such reference patterns.

The highly complex sounds of human speech and the complex patterns of printing and handwriting illustrate the difficulties involved in automatic pattern recognition. Currently, in order to supply data to modern high-speed electronic systems, it is usually necessary to prepare input information specially, as by punching cards, encoding magnetic characters on a sheet, or punching paper tape. These methods of converting input information to machine language are time consuming, expensive, and subject to error. Many attempts are currently being made, therefore, to devise systems for the automatic recognition of speech, print and handwriting. With such pattern recognition systems data processing operations can begin directly with information derived from the predominantly used modes of communication.

So many variations are encountered in speech and in writing, however, that complex compensating mechanisms have had to be adopted in recognition equipment. The human mind, of course, can readily distinguish the meaningful content of most communications despite the concurrent presence of what may be regarded as noise effects. As one example, handwriting is so highly individual that an expert can often identify the source even where an uncharacteristic style has been attempted by the writer. The same message, handwritten by a number of different persons, can be distinguished except where the writing is so unreasonably bad as to be illegible.

The recognition of speech poses subtler and additional problems, primarily because of the transitory nature of speech, and the greater number of variations possible. Meaning is derived by a listener from what is said and also from the manner in which it is said, despite differences in loudness, speech rate, intonation, pitch and inflection. The problems involved in the recognition of the primary informaiton content of speech are nonetheless not insuperable, and marked advances toward automatic recognition have been made by electronic devices which respond to certain energy and frequency distributions in sound which can characterize particular spoken words or subunits of words. It has separately been shown that many spoken sounds, which may or may not correspond to phonetic syllables, may be reliably identified or distinguished through the existence of other selected properties. Clearly, as many of these different properties should be used as can reasonably be accommodated by a system without involving meaningless redundancies. The importance which can be attached to different properties and characteristics is, however, highly variable. Certain characteristics may be very reliable indicators when used in one word, but be quite ambiguous and indefinite as they occur in a different word. The various properties must therefore be weighted, and each combination of properties must be considered as a whole in identifying the manifestation which the combination represents.

This determination of the interrelationship between the different identifiable properties of a manifestation is a necessity for any versatile recognition machine. In providing a reference pattern or pattterns for recognizable manifestations it has sometimes been the practice to use a number of repetitions of each manifestation, and to additively combine the effects of the repetitions. As one example, amplitude distributions with time in a spoken word may be used to generate correspondingly varying curves in rectangular coordinates. The curves then are superimposed on each other to provide an aggregate representation which accounts for minor variations. This technique, however, limits the number of properties which can be considered and is not readily repeatable. A different technique which is used is to provide calculated values for each property in a manifestation, but this requires a tedious collection and reduction of input data and is time consuming and expensive even if a high speed data processor is used. The processes heretofore used for gathering the necessary statistics have therefore been complex and prohibitively costly for use in practical applications.

It is therefore an object of the present invention to provide an improved automatic recognition system for manifestations of intelligence.

A further object of the present invention is to provide an improved automatic recognition device capable of providing a selected weighting of given properties of manifestations of intelligence.

A further object of the present invention is to provide an improved recognition arrangement for properly weighting different recognizable properties in speech.

A further object of the present invention is to provide an improved process for preparing a reference pattern for use in automatic recognition machines.

Manifestation recognition devices in accordance with the present invention utilize a reference pattern prepared so that individual properties in a manifestation are weighted according to a selected proportionality. On identification of the various properties in a sample manifestation a combined value is derived to which each of the properties makes an appropriately significant contribution. Methods in accordance with the invention utilize successive steps in the preparation of a recognition pattern by which elemental areas of the recognition pattern are caused to have light transmissivity characteristics which vary according to the logarithm of the probability of occurrence of a given property in the manifestation involved.

In a specific form of device in accordance with the present invention, electrical signal representations of spoken sounds which are to be identified may be provided to various measurement devices which identify the existence or absence of specific properties in the different sounds. For each spoken word or word subunit under examination, the identified properties are caused to actuate selected ones of a number of pairs of lights, in a pattern which indicates the presence or absence of the individual properties. The group of lights is aligned along a radius of a reference pattern disc on which different radial segments are provided with property reference patterns of variable opacity and representative of separate words or word subunits. In this form of device, small areal divisions of maximum opacity represent values of properties most likely to occur when the word is said, while areas of minimum opacity represent values of the properties least likely to occur. Between these two extremes, the opacity is caused to vary in accordance with the logarithm of the probability of the measurement value for the word. Light transmitted through each of the areal divisions of a radial property reference pattern is directed onto a single photosensitive element, which therefore additively combines the light contributions from each of the light sources. Because the opacity of each reference pattern area varies in accordance with a logarithmic function, the signal derived from the photosensitive element effectively represents the product of the various measurement probabilities. The identified word is indicated by determining the word reference pattern through which minimum light is transmitted.

In methods in accordance with the invention, reference patterns for automatic recognition machines are prepared by photographic means under control of separate property measurement elements. At least a pair of lights is employed for each measurement to be made. As a given word is spoken successively by a person, or by different persons, a selected one of each of the light sets, representing either the existence or the absence of the selected property, or one of a group of conditions, is flashed for a predetermined duration. The variations in the manner in which the word is spoken, and in the resultant combinations of lights which are flashed, cause different exposures of the various areal divisions of the property reference pattern on the film, as the film is held fixed in a position corresponding to the sample word being entered. The film is then developed so that the opacity of a given areal division is proportioned to the logarithm of the probability of occurrence of the given property.

The foregoing and other objects, features and advantages of the invention will be apparent from the following more particular description of a preferred embodiment of the invention, as illustrated in the accompanying drawings.

The system which is here described is merely one example of manifestation and pattern recognition systems, but is particularly meaningful because it satisfies very critical requirements. Specifically, the example described is a speech recognition machine which is intended to recognize certain words out of a selected but nevertheless extensive vocabulary. It is intended to identify each spoken word of the vocabulary, irrespective of normal and reasonable variations in the speech of an operator or different operators, and to do so with sufficient rapidity for the input speech to take place at normal and convenient rates. Other examples of different kinds of pattern recognition might also be given, including recognition of printed and handwritten characters, as systems in accordance with the invention require only that pattern properties be identified.

Figures 1, 2, 3, 4:
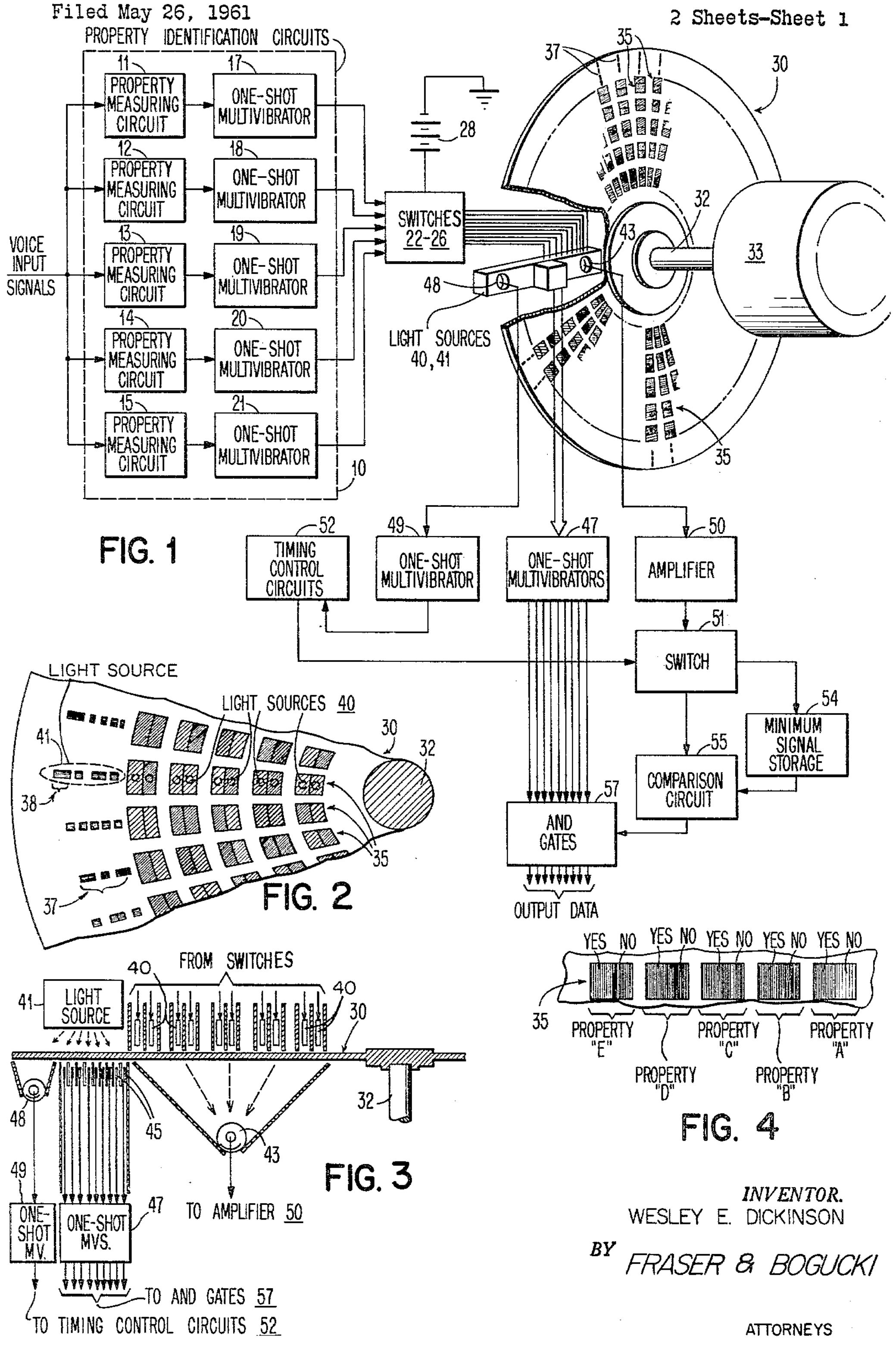
FIG. 1 is a combined block diagram and perspective view of one arrangement of a manifestation recognition system in accordance with the present invention.
FIG. 2 is an enlarged side view of a fragment of a reference pattern employed in the arrangement of FIG. 1.
FIG. 3 is a plan sectional view of a portion of the arrangement of FIG. 1.
FIG. 4 is an enlarged idealized representation of elemental reference pattern areas on the reference pattern of FIG. 2.

Referring now to FIGS. 1, 2 and 3, electrical signal representations of a spoken word as derived by a microphone and amplifier system (not shown) are provided by a group of separate measurement devices or property identification circuits 10. The identification circuits 10 include a number of individual property measuring circuits 11–15, selected in accordance with the stored vocabulary and the degree of reliability which it is desired to attain with the system. Because of the complexities involved in speech recogniton, many dfferent types of measurements have been evolved and conceived, and systems in accordance with the present invention are amenable to the use of most of these different measurements, even though the measurements themselves may be of wholly different types.

Early work in the field of speech recognition used frequency and energy distributions with time as a basis for distinguishing sound patterns. Sounds which are voiced, that is sounds which emanate primarily from resonance of the vocal cords, can be characterized by the existence of frequencies ranging up to several thousand or more cycles per second. The voiced sounds, for example, include most of the vowel sounds. It has been shown, moreover, that the different voiced sounds in a single multiple syllable word will often follow characteristic energy and frequency distribution patterns. Words are recognized by comparison of sample patterns to previously prepared standard patterns representative of such distributions. In these as well as in many other circuits, some form of "normalizing" is usually employed, so as to compensate for the different speech rate, amplitude and frequency characteristics of different individuals. Whether normalizing is used or not some selected time base is generally adopted.

The frequencies which characterize the voiced sounds are ascertainable even though the oscillations are of relatively brief duration and are damped by the human speech mechanism. The so-called "frictional" sounds, however, are much more noise-like in character and are typically distinguished by much higher frequency components which may be identified by appropriate filters. By closer analysis, various voiced and frictional sounds may be distinguished and a vocabulary of recognizable words built up, based upon the reference patterns.

Another more recent and potentially much more powerful technique does not require either normalization or the adoption of a time base, but segments each word in time in accordance with certain transitions in the word itself. According to this technique, voiced speech is very reliably identified by an asymmetry between components of opposite polarity in the complex multifrequency speech wave. Furthermore, by varying the phase relationship of these multifrequency components, the asymmetry characteristic changes in certain ways which distinguish the different kinds of voiced (or partially voiced) sounds from one another. Using these relationships, as well as the recognition of various frictional sounds, there are established "machine syllables" on which may be based a logical notation having both quality and time significance. Word recognition is then accomplished by comparison of generated sequences against stored sequences in appropriate switching arrangements. The use of machine syllables requires, when used in this way, considerable discrimination against noise as to each property. Greater reliability may be gained by increasing the number of properties. Yet, as described above, this entails a great deal of work in order to get best efficiency with a particular operator, and extensive changes may be needed for other operators. The present invention permits these different techniques and properties to be used together in a manner which allows the proper weight to be attached to each property.

The term "property measuring circuit" therefore should be taken to mean any type of measuring circuit which provides a meaningful output signal for pattern and manifestation recognition. A typical example of such a circuit is shown in FIG. 1 of U.S. Patent No. 2,646,465 of K. H. Davis et al. as described in col. 4, lines 55 through 75 thereof. The phonetic elements disclosed therein may be treated as properties of speech and the combined elements may be taken as such a property measuring circuit. Preferably, each of these circuits should include a threshold circuit or arrangement capable of providing a selected signal to noise ratio. Threshold circuits as such need not necessarily be employed, however, because the present system automatically compensates for probability factors. Here it should be noted that while only simple "yes-no"

decisions are made here as to the various properties, the decisions may involve a greater number of alternatives. Energy content at a given frequency may be measured, for example, and different property indications given for each of a half dozen different levels. Output signals from each of the property measuring circuits 11–15 trigger different ones of a group of associated one-shot multivibrators circuits 17–21 respectively. The one-shot multivibrators 17–21 provide, when triggered, like pulses which are of selected duration and amplitude. In this arrangement, these pulses last for at least two cycles of operation of the associated reference pattern mechanism. The pulses control the operation of separate switches 22–26 respectively which are coupled to a regulated power supply 28 (shown schematically.) The switches are arranged, in their normal state, to couple the power supply 28 to a first one of two output terminals. In this normal state, the switches indicate the absence of the property to which the associated measuring circuit 11–15 is responsive. Under control of the output signal from the associated one-shot multivibrator 17–21, however, each switch 22–26 couples the power supply 28 to the opposite output terminal for the selected duration. Signals on these output leads denote that the specific property has been detected in the voice input signals. For convenience, the properties are designated A, B, C, D and E respectively, and the presence of the property is indicated by A while the absence of the property is indicated by $\bar{A}$. If more alternatives were used for any property a corresponding number of lights and an appropriate trigger system would be used.

The A–E signals control the generation of light patterns in a word selection device which uses a variable opacity reference disc 30 having a transparent body. The reference disc 30 and associated light generating, light collecting and detecting elements are contained within an enclosure (not shown) which shields the operative elements from ambient light and where necessary from interference between the various independent light sources. The disc 30 rotates on a central shaft 32 which is driven by a constant speed motor 33.

Various property reference patterns 35 are disposed along radially extending segments about the circumference of the disc 30. Each radial segment is further divided along the radial direction into small areas which vary in opacity in a predetermined manner. Each radial segment also includes a word identification pattern 37 which serves to generate a desired digital code representative of the word with which the property pattern 35 is associated. An index pattern 38 is also disposed at one selected circumferential position about the disc 30.

These details may be better understood by reference to the view of FIG. 4 in addition to FIGS. 2 and 3. FIG. 4 represents a fragment, in greatly enlarged form, of a portion of the reference disc 30. The adjacent property patterns 35 are innermost relative to the disc 30, the word identification patterns 37 are next, and the index pattern 38 is at the outermost position, although this order may be shifted or reversed. Those skilled in the art will recognize that the disc 30 is merely one example of a cyclic member which moves so as to cause successive patterns to scan past a given axis. Each property reference pattern 35 has a pair of variable opacity areal divisions for each of the five properties, A, B, C, D and E which are used in this example. The areal divisions which make up each pair represent the presence and absence of the given property. When the number of possibilities for a given property is greater than two, the areal divisions are made to correspond in number. Each areal division has an opacity which is proportional to the logarithm of the probability that a given property condition will occur in the word whih the property pattern represents. The word identification patterns 37, however, are used to generate a binary code and so consist of areal elements which are either of maximum transmissivity or of maximum opacity. A nine binary digit code is illustrated. The circumference upon which the index pattern 38 is positioned is entirely transparent except for the index pattern 38 itself, which serves as a marker to denote successive rotations of the drum 30 relative to a given fixed point or axis.

The signals A–E and $\bar{A}$–$\bar{E}$ which denote the presence and absence of the various properties for "yes-no decisions" control different ones of a set of like lights 40. In order to have high density storage of the data represented by the patterns on the drum 30, these lights 40 are preferably very small, and may be neon elements, electroluminescent elements, or the like. It is particularly to be noted that all the lights 40 should have like characteristics, including intensity, aging and response characteristics. A single light 41 is employed in conjunction with the word identification patterns 37 and the index pattern 38, but this light 41 is shielded from the property patterns 35. The lights 40, 41 are positioned along a selected fixed radial axis relative to the drum 30, and thus disposed so that the patterns on the drum successively scan past during rotation. Each of the lights 40 is aligned with a different areal division of the property patterns 35.

A light collector system is employed adjacent the property or reference patterns 35, so that light beams directed through the disc 30 from the lights 40 impinge similarly on a single photosensitive element 43, here shown as a photocell, although any photosensitive mechanism having sufficient sensitivity may be used. Separate photosensitive elements 45, appropriately shielded (see FIG. 3) so as to receive only light passing through a corresponding digital valued area, are employed in conjunction with the word reference pattern 37. Each of these elements 45 is coupled to an associated one-shot multivibrator 47, the pulse groups provided at the output terminals of the one-shot multivibrators 47 thus forming in binary code the successive words represented on the drum 30 as they pass the elements 45. At the radius of the drum 30 containing the index pattern 38 position there is employed a single photosensitive element 48 coupled to a one-shot multivibrator 49 and providing pulses which mark the passage of the index pattern 38 through the fixed axis.

An amplifier circuit 50 coupled to the photosensitive element 43 applies signals generated thereby to a switch 51 which is operated by a timing control circuit 52. The timing control circuit 52 operates during successive cycles of the disc 30 to switch the signals from the photosensitive element 43 either to a minimum signal storage circuit 54 or to a comparison circuit 55 on alternate cycles of the disc 30. Because the signal representative of a word need not be applied in synchronism with the rotation of the disc 30, the timing control circuit 52 is utilized to insure that at least one full rotation of the disc 30 is provided for storing the minimum signal derived from the reference pattern mechanism, and that another full rotation is then provided for identification of the word by comparison of the transitory signal from the element 43 to the stored signal level. The timing control circuit 52, therefore, responds to the pulse from the one-shot multivibrator 17–21 and to the index pulses from the one-shot multivibrator 49 to control the switch 51 so that the signals from the amplifier 50, following a pulse from a one-shot multivibrator 17–21, are provided to the minimum signal storage circuit 54 during the remainder of the revolution, and during the next complete revolution of the disc 30. Upon completion of the full revolution of a disc 30, the index pulse applied to the timing control circuits 52 actuates the switch 51 so that the signals derived from the photosensitive element 43 are applied to the comparison circuit 55. Effectively, therefore, the timing control circuit 52 is a triggered bistable device.

The minimum signal storage circuit 54 may be merely a capacitive circuit which is charged to a level determined by minimum excitation of the photosensitive element 43. An example of such a minimum signal storage circuit can be found in FIG. 5 as described in col. 10, line 42, through col. 11, line 44, of the hereinbefore mentioned U.S. Patent No. 2,646,465 of K. H. Davis et al. The comparison circuit 55 is an amplitude responsive circuit and provides an output signal, at the one point in the second full rotation of the disc 30 at which the stored signal and the transitory signal are substantially equal. An example of such a comparison circuit can also be found in the Davis et al. patent and is described both in col. 6, lines 9 through 15 and in col. 12, lines 51 through 71 of that patent.

When an output signal is provided from the comparison circuit 55, a digital code value is also derived from the word identification patterns 37. The pulse groups from the one-shot multivibrators 47 are applied to "AND" gates 57 and are gated through the "AND" gates 57 under control of the output signals from the comparison circuit 55.

The manner in which this system automatically takes into account the probability of specific property conditions may be better understood by reference to FIG. 4. The five different "yes-no" properties A–E which here serve as the basis for word recognition are represented by the light transmissivity characteristics of different pairs of areal divisions on a property reference pattern 35 on the disc 30. Light transmissivity variations which may exist for different words are shown in idealized and enlarged form. These variations are represented as opacity gradations against a transparent background with the highest degree of opacity corresponding to the highest probability to be encountered. It will be recognized that the light transmissivity variations need not be represented by differences in opacity, but may also be represented by differences in the light reflectivity of shaded areas. The optical sensing system which is employed may similarly assume a number of different forms, although the arrangement shown in FIGS. 1–4 is preferred.

Each of the paired variable opacity areas corresponding to a given property is meaningfully used in establishing the interrelationship between the properties found to exist in a given word. Where there is an extremely high probability that a property will be present, the corresponding one of the paired areas (designated the "yes" area in FIG. 4 to denote the existence of the property) is highly opaque, and here represented as a darkened area. The other area, designated "no" to connote the absence of the property, then has a degree of opacity which is complementary on a logarithmic scale to the opacity of the "yes" area. Such a condition is represented in FIG. 4 by property "A." Where the significance of a property as applied to a given spoken word is less definite, the opacities of the "yes" and "no" areas are both intermediate the extremes. A condition in which the "yes" is slightly more probable than the "no" is shown for property B. Property C, in which the "no" area is slightly more opaque than the "yes" area represents the converse, in which it is more likely that the property will be absent, although there is still some probability that the property will be found to exist. Properties "D" and "E," in which the "no" areas are strongly opaque, are properties which are unlikely to be found to exist in conjunction with the given word.

With a set of areal divisions greater than two in number only one of the areal divisions need have an opacity gradation. With more than two alternatives only positive indications of the presence of a property are given.

Now, as described below, the gradation of the opaque areas is in accordance with the logarithm of a probability and not in accordance with the probability itself. If there is a nine out of ten chance that a given property will be found to exist (or be absent) the opacity of the corresponding area is not 90%, but the appropriate logarithmic value thereof.

This arrangement, therefore, does not rely directly upon the "yes-no" or "one out of a number" decisions in the property measuring circuits 10, but initiates a combined digital and analog decision making sequence by actuating the lights 40 adjacent the property patterns 35 in a pattern determined by the spoken word sample. This light pattern is held for a first complete revolution of the reference disc 30, during which the various property patterns 35 scan across the axis of the lights 40 in sequence. All of the areal divisions of each property pattern 35 pass across the set of lights 40 at the same time. In the intervals between registration of the successive property patterns 35, there is maximum light transmission through the disc 30 because of the transparent background of the disc 30, and a maximum signal level is provided by the photosensitive element 43.

The first complete revolution of disc 30 may be referred to as a storage cycle, because during this revolution the signals provided from the photosensitive element 43 are applied through the switch 51 to the minimum signal storage circuit 54. The minimum signal level is derived when the pattern in which the lights 40 have been excited results in the least transmission of light through the disc 30. On the next revolution the transitory signal from the element 43 is compared to the stored signal, and the comparison output signal is provided at the instant when the property pattern 35 for the most likely word crosses the axis. At this time the word recognition pattern is read out through the "AND" gates 57.

Those properties, such as properties "B" and "C" in FIG. 4, which have intermediate opacity gradations prevent the stored signal from ever approaching absolute zero. This would signify that a word had been recognized with absolute certainty which is, of course, not realistic. On the other hand, it may intuitively be seen that the use of logarithmic factors for the different properties materially enhances accuracy and reliability. For other words than the one correct word the light transmitted will usually be appreciably greater, because a significant property will not be present in the correct relationship. Where the pattern in which the lights 40 are excited varies only as to the less sharply defined properties, optimum results are still achieved for the given conditions. What the system indicates is the closest related word to the word input, or the "best match," whether or not the input word is included in the system library.

The system therefore combines digital and analog techniques by utilizing the binary valued "yes-no" relationships or "one out of a number" decisions if desired in the identification of properties and the generation of light patterns, along with the conversion of these binary patterns to analog values. The system also is analog in nature in summing the contributions from the separate lights 40. Mathematically, the signal which is derived from the photosensitive element 43 in making the "best match" comparison represents the product of the probabilities for each of the properties.

The use of the best match between minimum signals is further advantageous because it is much easier to distinguish one likely signal from another by this means than on the basis of amplitude peaks. A 98% blockage of the light transmission through the disc 30 might not readily be distinguished from a 97% blockage if these peak values were being compared. The actual comparison, however, would be between 2% of light transmitted as against 3% of light transmitted, and the 50% relative difference is quite readily distinguished.

Because the system provides a simple way to weight measurements in accordance with probabilities it affords the basis for further checking and verification of the manifestations which are under analysis. The signal level at best match is often a measure of the certainty with which a manifestation can be accepted. If each word in a vocabulary of spoken words is represented by a stored digital value, for example, the signal level obtained at best match may be converted to a digital quantity which is then compared to the stored value for the word. The identified word can then be accepted if the comparison that the identification is within acceptable limits of accuracy.

The system also makes it possible to utilize the word context established by successive word recognitions to verify further choices. We know, for example, that a noun is seldom directly followed by another noun, and a verb is not often directly followed by a second verb. Thus, on the basis of the identification of a noun there will be a much higher probability that the next word will be a verb and not a noun. Similarly, word classification can also help to distinguish words (e.g., the words "for" and "four") which are exactly alike in sound. The reference patterns may therefore include one or more separate indications of word classification, which may be stored and compared to previous or subsequent determinations in order to ascertain the sequence having the highest probability of being correct.

Figure 5:
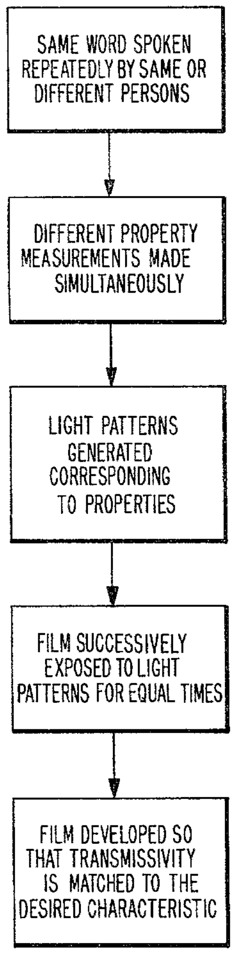
FIG. 5 is a block diagram showing successive steps which may be employed in methods in accordance with the present invention.

One example of the way in which a reference pattern may be prepared photographically in accordance with the invention is illustrated in FIG. 5. The mechanism which is used may be essentially that shown in FIGS. 1–4 except that the light sensitive material of the reference member is, of course, initially unexposed and undeveloped. The light sources to which the light sensitive material is exposed are actuated for precisely controlled intervals in response to identification of the various properties. The property patterns may be imposed directly on the disc itself, after application of a light sensitive film, or on separate film frames or plates from which the patterns may be transferred mechanically or by photographic means to a disc or other reference member. An appropriately configured image mask may be used adjacent the light sensitive member so that the light spot outline is sharply defined and the exposure intensity is uniform across the entire illuminated area. Furthermore, the intensity of each of the illuminating sources, and the durations for which they are excited, are the same for each exposure, both as between different lights, and as to successive exposures.

With this mechanism, property patterns as to reference words may be established by having an individual speak the same word a number of times in succession, or by having a number of individuals speak the same word separately at different times. The choice as to the manner in which this is done is done will largely be determined by the ultimate use of the word recognition machine, and whether it is to be employed with a specific selected operator or a number of different operators. As each word is spoken, the property measurement circuits respond to the electrical signals representative of the word by identifying the existence or absence of the selected properties in the word, with "yes-no" decisions, or by identifying specific conditions of a given property having more alternatives. As described above, the property measurement circuits may respond to frequency-time distributions, particular frequency characteristics, asymmetry characteristics and a wide variety of other selected information, such as the occurence of more than one voiced sound in the selected word. Each time a given word is spoken, the property characteristics are indicated by the excitation of one of the pair or set of lights which is used for that property. The inevitable differences in modulation and expression of the same word will usually result in different light patterns during at least some of the successive enunciations. As reference samples are accumulated, however, the areal divisions for the given properties some to represent, through extent of exposure, the probability that the specific property conditions will occur in the word. Because of the highly variable nature of speech, few indications will be invariant, and property conditions will usually be indentified to an intermediate degree. Each of the elemental areas of a pair or set corresponding to that property will, therefore, be exposed somewhat, in a proportionality dependent upon the number of times each of the associated light sources has been acuated.

It should be noted that there is a relationship between the probability value which can be attached to a given reading and the threshold level at which the associated measurement circuit is set. If, for example, a high amplitude signal is required to exceed the threshold level and to provide an output signal indicative of the existence of a property, there should be a sharper contrast between the "yes" and "no" areas of the pairs for the majority of properties. In effect, the "no" areas will be accentuated. This limits the usefulness of the individual properties, however. The selection as to the threshold level must, therefore, be made relative to the total number of properties which are available and to the total number of readings which it is desired to use in generating the light patterns for exposure.

Finally, in accordance with the invention, the exposed film is developed in a controlled fashion. The development is such (see FIG. 6) that the opacity (more generally, the density) of a given area is made proportional to the logarithm of the probability of the occurrence of a given property condition. The number of exposures of a given areal division is a measure of the probability of occurrence of the condition which the division represents. The photochemical change in the sensitized film with exposure is such that, in combination with the development process, the desired logarithmic variation is closely approximated.

Figure 6:
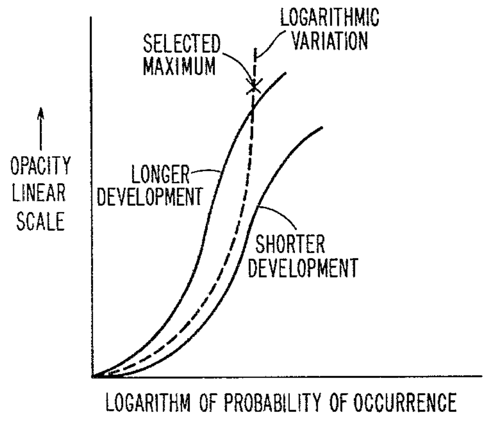
FIG. 6 is a graphical representation of one manner in which a reference pattern may be processed in methods in accordance with the invention.

As shown in FIG. 6 the normal development characteristic of the film, when exposure is plotted against the resultant opacity, is somewhat S-shaped, but approximates the ideal logarithmic curve for brief and intermediate exposure times. These S-shaped curves vary in slope, depending upon the development time which is used. At peak values, opacity levels off, so that the maximum opacity must be selected to be within the region of the ideal curve. The position of the curve may be varied along the abscissa by selecting the individual exposure intervals. Then, the development may empirically be controlled so as to simulate the logarithmic function. If desired, samples exposed under known conditions may first be developed separately to provide known standards for final adjustment.

Among the many advantages which accrue from this process it is important to note the simplicity by which statistics may be gathered and used to define extremely complex relationships. Heretofore, close analysis of the speech characteristics of one person has had to be made preparatory to an extensive compilation of a vocabulary. The larger the vocabulary, the more difficult and time consuming has been the problem of proper weighting of individual factors. With methods in accordance with the invention, however, directly usable reference patterns are provided without the need of complex additional equipment.

In generating the patterns during the accumulation of reference samples it may be convenient to use a recording of words in a specific sequence, and then to sort the word patterns out and actuate the light system. In this way a complete reference member may be provided and developed at high speed. Or an individual operator may position the reference member and enter successive or repeated reference word patterns.

Among the alternatives which will suggest themselves to those skilled in the art are the use of different reference members for different vocabularies or different operators. Because the reference members are mechanically stable, they may readily be interchanged as needed. Image masks and light beam focusing systems may be used in conjunction with both the light sources and the photosensitive elements, to insure uniformity. Diffused light sources and uniformly illuminated photosensitive elements will also contribute to this end.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for identifying a given manifestation by comparison to a group of stored representations of manifestations, including a group of property measurement circuits responsive to the given manifestation for identifying different property conditions in the given manifestation, radiant pattern generating means responsive to the property measurement circuits, reference pattern means including a number of reference patterns representing different manifestations for modifying the characteristics of the generated radiant patterns in accordance with the logarithm of the probability of occurence of each represented property condition in the given manifestation, means for additively combining the modified radiant patterns into a common signal and means responsive to the common signal for identifying the given manifestation by closest similarity to the manifestation represented by a given one of the reference patterns.

2. A system for identifying manifestations including means for identifying individual property conditions in manifestations under analysis, means for generating digital valued radiant patterns from a plurality of sources representative of the identified property conditions, means providing successive reference manifestations for modulating the intensity of the radiation from each of the sources in accordance with the probability of the occurrence of the associated property condition in the successive reference manifestations, and means responsive to the modulated radiant patterns for identifying the existing manifestation.

3. A system for identifying a manifestation represented by electrical signal patterns as most closely corresponding to a given one of a group of reference patterns, the system including the combination of a group of property measurement circuits responsive to the electrical signal patterns representing a manifestation for generating, for each different property, a signal representing the existence of a given property condition in the electrical signal patterns, a movable reference pattern member having different reference patterns thereon each arranged to represent by light transmissivity variations the probabilities of the different property conditions occurring in a given different manifestation, means for moving the reference pattern member past a selected optical axis, and the light transmissivity variations having elemental areas which vary in accordance with the logarithm of the probability of occurrence of each individual property condition, light generating means positioned adjacent the optical axis and the reference pattern member and coupled to the property measurement circuits for generating binary valued light patterns representative of the existence of the respective property conditions, and means responsive to light from the light generating means as modified by the transmissivity characteristics of the reference patterns for selecting the reference pattern which most closely corresponds to the generated light pattern.

4. A system for identifying a manifestation which is provided as electrical signal representations, by selecting the manifestation most closely corresponding from a group of reference patterns, the system including the combination of a group of property measurement circuits responsive to the electrical signal representations for generating for each different property a signal representing the existence of different property conditions in the given manifestation, a movable reference pattern member having different reference patterns disposed in spaced relation thereon and each defined by a number of areal divisions arranged in sets, each areal division representing by light transmissivity variations the logarithm of the probability of the occurrence of a selected property condition in the given manifestation, means for moving the reference pattern member such that the different reference patterns scan past a selected axis, light generating means positioned adjacent and along the selected axis and coupled to the property measurement circuits, the light generating means directing digital valued light beam patterns representative of the occurrence of the selected property conditions in the given manifestation against the reference pattern member, means responsive to light received from the reference pattern member originating with the light generating means and modified by the transmissivity characteristics of the areal divisions for providing a signal representaive of the sum of the contributions from the individual light beams, and means responsive to the summed signal contributions for selecting the manifestation represented by a reference pattern which most closely corresponds to the given manifestation.

5. A system for selecting, from a group of reference patterns representing different manifestations, that manifestation to which a given manifestation provided as electrical signal representations most closely corresponds, including the combination of a group of property measurement circuits responsive to the electrical signal representations, each of the property measurement circuits generating, for a different one of a number of possible properties in the manifestation, a signal representing the occurrence of a selected property condition in the given manifestation, a movable reference pattern having a substantial transparent background and individual property reference patterns thereon, means for moving the property reference patterns in scanning fashion past an optical axis, each property reference pattern consisting of a number of sets of areal divisions, the opacity of the divisions of each of sets varying in accordance with the logarithm of the probability that a given property condition occurs in the given manifestation, the reference pattern also including manifestation identification patterns associated with each property reference pattern and an index pattern, the manifestation identification patterns being in the form of binary-valued combinations which identify the manifestation to which the reference pattern corresponds, a plurality of pulsed light generating means disposed in sets along the selected axis of the reference patterns means and arranged to provide substantially pulsed light beams of substantially like area, intensity and duration through the individual areal divisions of each reference pattern, one of the light sources of the set being actuated in response to the occurrence of a given property condition, light generating means for transmitting light through the manifestation identification patterns and the index pattern on the reference pattern member, photosensitive means positioned on the opposite side of the reference pattern member from the light generating means to additively combine light transmitted through the reference patterns, a plurality of additional photosensitive means coupled to receive light transmitted through the index patterns, means coupled to the photosensitive means and to the additional photosensitive means for storing the minimum signal derived by the photosensitive element, means coupled to the photosensitive means, the additional photosensitive means and the minimum signal storage means for signaling when the property reference pattern which provides minimum light transmissivity for a given pattern of light generating means is in position at the reference axis, and means responsive to the signal indication of minimum light transmissivity and to the binary value represented by the manifestation of the identification pattern then positioned along the axis for indicating the identified manifestation in binary form.

6. A voice operated word recognition system including a combination of means providing electrical signal representations of a spoken word a rotatable reference pattern member containing a number of reference patterns thereon, each reference pattern occupying a different radial area about the member and consisting of sets of variable opacity areas disposed at successive positions along a radius of the reference pattern, the opacity of each area varying in accordance with the logarithm of the probability that a specific property condition occurs in the word to which the area corresponds, light generat-means aligned with the different property-representative areas in the reference patterns, property measuring circuits responsive to the electrical signal representations for actuating the light generating means in a pattern determined by the properties of a spoken word, and means disposed on the opposite side of the reference pattern member from the light generating means for detecting the reference pattern which provides minimum transmissivity of light from the light generating means through the reference pattern member.

7. A speech recognition system including a cyclically movable reference pattern member containing a number of reference patterns thereon, the member being substantially transparent and the reference patterns each consisting of sets of variable opacity areas arranged to move simultaneously past a given axis during movement of the member, the opacity of the areas of each set varying in a selected proportionality to the probability of the occurrence of a different property condition in a word represented by the reference pattern, means for cyclically moving the reference pattern member, a plurality of like actuable light sources positioned along the given axis relative to the reference pattern member and each aligned with a different areal position relative to the reference pattern, means responsive to different properties in a spoken word for activating selected ones of each set of lights in accordance with the occurrence of the specific related property condition, and means positioned on the opposite side of the reference pattern member from the light sources for cumulatively combining the light derived from the light sources through the reference patterns to identify the spoken word.

8. A system for recognizing manifestations including the combination of a plurality of circuits for measuring different properties of a given manifestation, a plurality of radiating elements coupled to be controlled by the property measuring circuits and to provide a digital valued pattern representative of the occurrence of various properties, spaced apart means for cumulatively combining the radiation derived from the radiating elements, reference means disposed between the radiating means and the means for cumulatively combining the radiation, the reference means providing separate reference patterns which modulate the intensity of the radiation transmitted from the radiating elements in accordance with a logarithmic function, and means coupled to the means for cumulatively combining the modulated radiation for identifying the occurrence of a selected characteristic manifestation as represented by a given reference pattern.

References Cited by the Examiner

UNITED STATES PATENTS

| | | | |
|---|---|---|---|
| 2,580,270 | 12/1951 | Badgley et al. | 250—219 X |
| 2,616,983 | 11/1952 | Zworykin et al. | 250—219 |
| 2,646,465 | 7/1953 | Davis et al. | 250—217 X |
| 2,685,615 | 8/1954 | Biddulph et al. | 179—1 |
| 2,930,899 | 3/1960 | Lyon et al. | 250—233 |
| 2,942,973 | 6/1960 | Patrick | 96—27 |
| 2,957,766 | 10/1960 | Woodacre | 96—27 |
| 2,968,789 | 1/1961 | Weiss et al. | 340—146.3 |
| 2,968,793 | 1/1961 | Bellamy | 250—219 X |
| 2,978,590 | 4/1961 | Shepard | 250—233 |
| 2,978,675 | 4/1961 | Highleyman | 340—146.3 |
| 3,016,518 | 1/1962 | Taylor | 340—146.3 |
| 3,037,077 | 5/1962 | Williaris et al. | 179—1 |
| 3,072,889 | 1/1963 | Willcox | 250—219 X |

RALPH G. NILSON, *Primary Examiner.*

WALTER STOLWEIN, *Examiner.*